United States Patent [19]
Evans

[11] Patent Number: 5,299,273
[45] Date of Patent: Mar. 29, 1994

[54] OPTICAL FIBER TO LAMINATE ADAPTER

[75] Inventor: David Evans, San Diego, Calif.

[73] Assignee: Teledyne Ryan Aeronautical, San Diego, Calif.

[21] Appl. No.: 975,057

[22] Filed: Nov. 12, 1992

[51] Int. Cl.$^5$ .............................................. G02B 6/36
[52] U.S. Cl. ........................................ 385/77; 385/12; 385/13
[58] Field of Search ................ 385/12, 13, 70, 74, 385/77, 79

[56] References Cited

U.S. PATENT DOCUMENTS

| | | | |
|---|---|---|---|
| 4,537,469 | 8/1985 | Kircher | 385/13 |
| 4,569,570 | 2/1986 | Brogardh et al. | 350/96.34 |
| 4,581,527 | 4/1986 | Crane et al. | 385/13 X |
| 4,584,616 | 8/1986 | Bowen et al. | 385/79 |
| 4,772,092 | 9/1988 | Hofer et al. | 385/13 |
| 4,950,043 | 8/1990 | Russom | 385/12 |
| 4,984,863 | 1/1991 | Parriaux et al. | 350/96.11 |
| 5,026,140 | 6/1991 | Russom | 350/96.29 |
| 5,026,141 | 6/1991 | Griffiths | 385/13 |
| 5,091,983 | 2/1992 | Lukosz | 385/13 |

Primary Examiner—Rodney B. Bovernick
Assistant Examiner—Phan T. Heartney
Attorney, Agent, or Firm—Brown, Martin, Haller & McClain

[57] ABSTRACT

An optical connector attached to an optical fiber embedded in a structure, such as a composite laminate part. The connector is attached by trimming the structure across the path of the fiber, exposing an end of the fiber that lies flush with the surface of the structure. The fiber end and the surrounding surface are then polished. The connector is placed in a micropositioner and the micropositioner is attached to the structure with the connector roughly in alignment with the fiber end. A light source is then placed at the other end of the fiber, which transmits light to the connector, and a light meter is attached to the connector. The micropositioner is adjusted to refine the alignment by moving the connector to a position where the light meter indicates a maximum intensity. When the light meter indicates a maximum intensity, the connector is secured in place on the structure using an adhesive. The micropositioner may be removed after the adhesive has hardened.

10 Claims, 1 Drawing Sheet

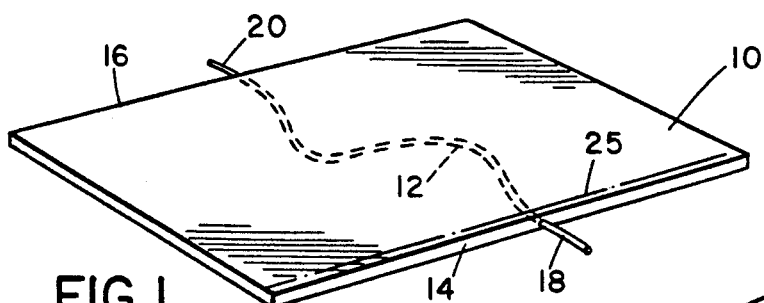
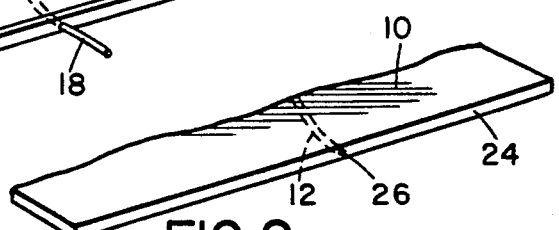
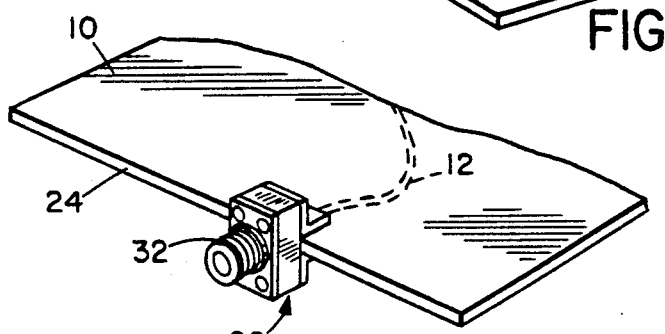
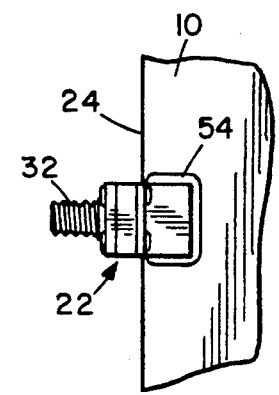
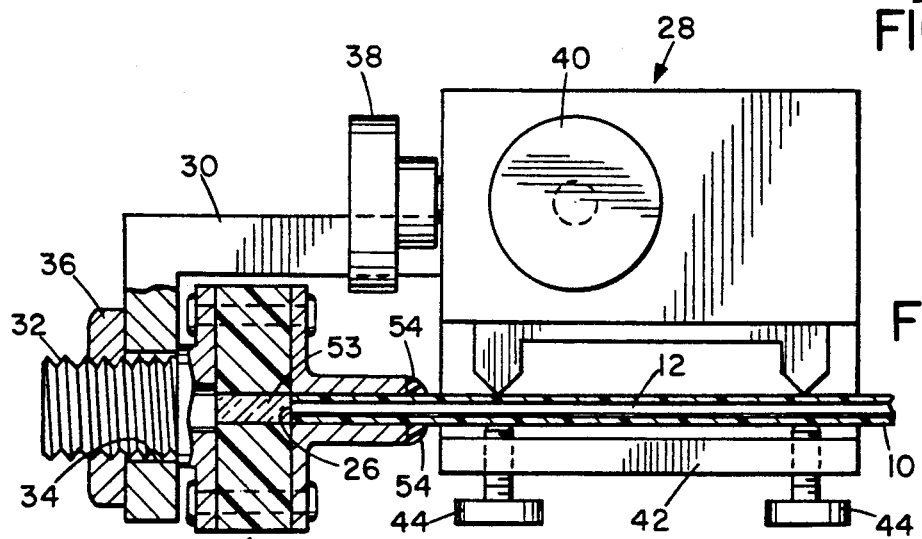
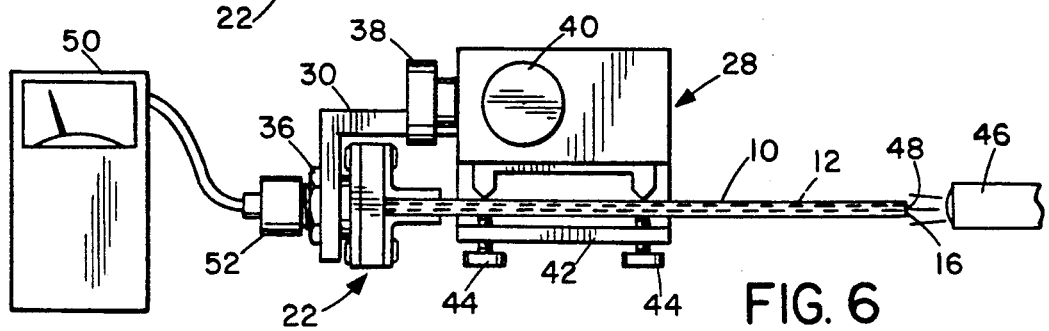

OPTICAL FIBER TO LAMINATE ADAPTER

BACKGROUND OF THE INVENTION

The present invention relates generally to optical fibers that are embedded in structures and, more specifically, to a method for attaching optical connectors to such embedded fibers.

Optical fibers may be embedded in many types of structural members. Systems having embedded optical fibers may detect damage or strain in aircraft, ground and water vehicles, and non-movable structures. In such systems, an optical signal is injected at one end of the fiber. A sensor is positioned either at the other end of the fiber or, if the other end is reflective, at the same end at which the signal is injected. Changes in intensity and travel time of the injected signal can be measured to determine the extent and location of the damage in the structure. The fibers may be arranged in a matrix shape to enhance localization of the damage, as disclosed in U.S. Pat. No. 4,581,527 issued to Crane et al.

In addition, embedded optical fibers may be used for communication between electronic systems, as is common in aircraft.

Optical fibers may be embedded in composite laminate structures, as disclosed in U.S. Pat. No. 4,772,092 issued to Hofer et al. and in U.S. Pat. No. 4,537,469 issued to Kircher et al. In composite laminate structures, the optical fibers may be placed between laminate layers or may be integral to the woven matting or "pre-preg" that forms the laminate layers. The matting may consist of fibers made of glass, graphite, boron, KEVLAR, or other suitable materials. The matting layers are commonly bound together with a resin binder, such as epoxy.

Optical fibers may be embedded not only in composite laminate structures, but may also be embedded in many types of resins, plastics, epoxies, metals, and other materials. For example, U.S. Pat. No. 4,950,043 issued to Russom discloses a method for embedding optical fibers in titanium.

Methods known in the art for fabricating structural members having embedded optical fibers commonly leave a portion of each embedded fiber protruding beyond the edge of the structural member. An optical connector may then be attached to this protruding fiber portion. Not only is aligning a connector with a dangling fiber portion a difficult task, but the structural member must be carefully handled during manufacturing and installation to avoid damaging the protruding fiber portions. Breakage of a protruding fiber portion may make it impossible to attach a connector to it using methods known in the art and may render the entire structural member unusable.

Although the protruding portions of fibers embedded in all types of structures are susceptible to damage, the protruding portions of fibers embedded in composite laminate structures are particularly susceptible to damage because they are cured in an autoclave at a high temperature, which vaporizes some or all of the cladding layer of the protruding fiber portions, making them quite brittle.

A method for attaching a connector to an embedded optical fiber that does not risk rendering the fiber or structure unusable would be highly desirable. These problems and deficiencies are clearly felt in the art and are solved by the present invention in the manner described below.

SUMMARY OF THE INVENTION

The present invention comprises a method for attaching a connector to an optical fiber embedded in a structure. The structure in which the fiber is embedded may comprise either a composite laminate or a solid piece of material. In the present invention, an optical connector is coupled with an end of the fiber that lies flush with the surface of the structure in which the fiber is embedded. Thus, damage to a portion of the fiber that protrudes beyond the structure does not preclude attaching the connector. In fact, any protruding fiber portions may be removed before applying the method of the present invention.

The surface of the structure on which the connector is to be mounted must be flush with and normal to one end of the fiber, and the end of the fiber must be smooth and polished to enhance light transmission. If the surface and fiber end are not in such a condition, they may be prepared using any suitable means such as cutting, grinding, sanding, or polishing. Only the surface of the structure immediately surrounding the fiber end need be prepared in such a manner.

When the surface has been prepared, the connector is placed in a micropositioner tool. The micropositioner has a base that can be rigidly attached to the structure. It also has an arm that may be moved extremely small but precisely controlled distances along two or three mutually perpendicular axes to position an object that is held in the arm. The micropositioner, carrying the connector, is moved to place the connector on the surface of the structure and in alignment with the fiber end. The micropositioner is then secured to the structure.

Any suitable light source is then placed at the other end of the fiber, which transmits light to the connector. A light meter that is responsive to the light produced by the light source is attached to the connector. The accuracy with which the connector is aligned with the exposed fiber end determines the intensity of the light transmitted from the fiber to the connector. Thus, the micropositioner arm can be adjusted to refine the alignment by moving the connector to a position where the light meter indicates a maximum intensity.

When the light meter indicates a maximum intensity, the connector is secured in place using any suitable means, such as an adhesive bond. The connector may then be released from the micropositioner, and the light meter and the light source may be removed.

A second connector may then be attached to the structure at the other end of the fiber using the same method.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is made to the following detailed description of the embodiments illustrated in the accompanying drawings, wherein:

FIG. 1 illustrates an optical fiber embedded in a typical composite laminate panel;

FIG. 2 illustrates the exposed end of the optical fiber at one edge of the composite laminate panel after trimming and polishing the edge;

FIG. 3 shows a typical optical connector attached to the composite laminate panel and aligned with the exposed end of the optical fiber;

FIG. 4 is a top plan view of the connector showing the adhesive attachment to the composite laminate panel after alignment;

FIG. 5 is an enlarged side view, with portions cut away, showing the connector mounted on a micropositioner for aligning the connector and holding the connector in alignment while the adhesive hardens; and FIG. 6 is a side view of the assembly of FIG. 5, showing the alignment method.

DESCRIPTION OF THE PREFERRED EMBODIMENT

In FIG. 1, a composite laminate panel 10 has an embedded optical fiber 12. Fiber 12 extends through panel 10 between a first edge 14 and a second edge 16, and has portions 18 and 20 that protrude beyond edges 14 and 16, respectively. Panel 10 may comprise any suitable reinforcing matrix, such as multiple layers of woven fiber matting, and a binder resin, such as epoxy. Methods for fabricating such composite laminate panels having embedded optical fibers are well-known and are not described herein. Furthermore, the method of the present invention is not concerned with protruding fiber portions 18 and 20, which may be removed before applying the method of the present invention.

Although the method of the present invention is discussed herein with respect to attaching a connector 22 to one end of fiber 12, the same method may be used to attach another connector (not shown) to the other end of fiber 12 and is not discussed herein in similar detail.

As shown in FIGS. 2–3, edge 14 of panel 10 should have a flat, smooth surface 24 on which to mount connector 22. To prepare edge 14, a portion of panel 10 adjacent to edge 14 may be trimmed using any suitable method, such as cutting, planing, grinding, sanding, or polishing. For example, a cut may be made along a path 25 adjacent to edge 14 and intersecting fiber 12, thereby exposing surface 24 and fiber end 26, which may then be polished to leave fiber end 26 flush with and normal to surface 24. Furthermore, the path along which panel 10 is cut may be dictated by engineering specifications for the final shape of panel 10. If panel 10 already has the desired shape, edge 14 may simply be ground or polished to leave fiber end 26 flush with and normal to surface 24.

In FIG. 5, a micropositioner 28 has an arm 30 on which connector 22 is mounted. Connector 22 may be mounted on arm 30 using any suitable mounting means, such as by extending the threaded portion 32 of connector 22 through an opening 34 in arm 30 and fastening a nut 36 on threaded portion 32. Micropositioner 28 also has two knobs 38 and 40 for adjusting the travel of arm 30 along two perpendicular axes.

Micropositioner 28 is then securely attached to panel 10 using any suitable attachment means that holds micropositioner 28 in rigid alignment with panel 10 yet allows micropositioner 28 to be easily removed. For example, a clamp 42 may be extended around an edge of panel 10 and tightening clamping screws 44. Micropositioner 28 should be attached at a point on panel 10 where connector 22 is substantially in optical alignment with fiber end 26. Suitable micropositioners include the "3900 Series" manufactured by DAEDAL, Inc.

In FIG. 6, a light source 46 emits light toward edge 16. Protruding fiber portion 20 has been removed, leaving fiber end 48, which receives the light. A light meter 50 has a mating connector 52, which is then attached to threaded portion 32 of connector 22. Fiber 12 thus transmits the light to light meter 50. Connector 22 may have a lens 53, such as self-focusing (SELFOC) lens, as shown in FIG. 5.

While monitoring light meter 50, knobs 38 and 40 are adjusted to move connector 22 into optical alignment with fiber end 26, which is indicated by a maximal intensity reading on light meter 50. Connector 22 may be aligned with the center axis of fiber 12 with an accuracy of five microns using this method. During this alignment step, light source 46 should remain stationary with respect to panel 10 to avoid undesirable variations in intensity. When light meter 50 indicates maximal intensity, connector 22 should be mounted on panel 10 using a suitable adhesive 54, such as epoxy. Light meter 50 may be removed.

When adhesive 54 has hardened, micropositioner 28 may be removed by loosening screws 44 and removing clamp 42, leaving connector 22 in optical alignment with fiber 12 and securely mounted on panel 10, as shown in FIG. 4. As discussed above, another connector (not shown) may then be mounted on panel 10 adjacent to edge 16 using the same method.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. A method for coupling an optical fiber embedded in a structure to an optical connector, said structure having a surface, said optical fiber having a first end flush with said surface and a second end, comprising the steps of:

mounting said optical connector on a first portion of a positioning tool, said first portion in movable relation to a second portion of said positioning tool;

disposing said optical connector on said surface, said optical connector in substantial optical alignment with said first end;

securing said second portion of said positioning tool in rigid relation to said structure;

introducing light into said second end of said optical fiber;

connecting a light meter to said optical connector for providing an intensity indication of said light;

refining said optical alignment with said positioning tool until said intensity indication is a maximum; and attaching said optical connector to said structure.

2. The method for coupling an optical fiber embedded in a structure to an optical connector described in claim 1, wherein said structure is a composite laminate panel.

3. The method for coupling an optical fiber embedded in a structure to an optical connector described in claim 2, wherein:

said surface is an edge of said panel; and said first end of said optical fiber is normal to said edge.

4. The method for coupling an optical fiber embedded in a structure to an optical connector described in claim 3, further comprising, before said step of disposing said optical connector on said surface, the step of polishing said first end of said optical fiber.

5. The method for coupling an optical fiber embedded in a structure to an optical connector described in claim 4, further comprising, before said step of polishing said first end, the step of simultaneously cutting through said composite laminate panel and said optical fiber.

6. The method for coupling an optical fiber embedded in a structure to an optical connector described in claim 5, wherein said connector has a lens.

7. The method for coupling an optical fiber embedded in a structure to an optical connector described in claim 6, wherein said lens is a self-focusing (SELFOC) lens.

8. The method for coupling an optical fiber embedded in a structure to an optical connector described in claim 1, wherein said first end of said optical fiber is normal to said surface.

9. The method for coupling an optical fiber embedded in a structure to an optical connector described in claim 8, wherein said connector has a lens.

10. The method for coupling an optical fiber embedded in a structure to an optical connector described in claim 9, wherein said lens is a self-focusing (SELFOC) lens.

* * * * *